(12) United States Patent
Bloomfield

(10) Patent No.: US 10,649,971 B2
(45) Date of Patent: May 12, 2020

(54) INCREMENTAL DYNAMIC DOCUMENT INDEX GENERATION

(71) Applicant: International Business Machines Corporation, Armonk, NY (US)

(72) Inventor: Neil G. Bloomfield, Kallaroo (AU)

(73) Assignee: International Business Machines Corporation, Armonk, NY (US)

(*) Notice: Subject to any disclaimer, the term of this patent is extended or adjusted under 35 U.S.C. 154(b) by 387 days.

(21) Appl. No.: 14/943,806

(22) Filed: Nov. 17, 2015

(65) Prior Publication Data

US 2016/0070735 A1 Mar. 10, 2016

Related U.S. Application Data

(63) Continuation of application No. 13/568,642, filed on Aug. 7, 2012, now Pat. No. 9,218,411.

(51) Int. Cl.
| | |
|---|---|
| G06F 16/00 | (2019.01) |
| G06F 16/22 | (2019.01) |
| G06F 16/31 | (2019.01) |
| G06F 16/93 | (2019.01) |
| G06F 16/23 | (2019.01) |

(52) U.S. Cl.
CPC ...... G06F 16/2272 (2019.01); G06F 16/2365 (2019.01); G06F 16/31 (2019.01); G06F 16/313 (2019.01); G06F 16/93 (2019.01)

(58) Field of Classification Search
CPC .............................................. G06F 17/303613
See application file for complete search history.

(56) References Cited

U.S. PATENT DOCUMENTS

| | | | |
|---|---|---|---|
| 5,202,982 A | 4/1993 | Gramlich et al. | |
| 5,204,958 A | 4/1993 | Cheng et al. | |
| 5,276,616 A * | 1/1994 | Kuga | G06F 16/313 |
| | | | 704/10 |

(Continued)

OTHER PUBLICATIONS

United States Patent and Trademark Office, Office Action for U.S. Appl. No. 13/568,642, dated Aug. 21, 2013, pp. 1-33, Alexandria, VA, USA.

(Continued)

*Primary Examiner* — Grace Park
(74) *Attorney, Agent, or Firm* — Jeffrey M. Ingalls

(57) ABSTRACT

A contextual index compendium that includes contextual index item generation rules that define document index entry generation transforms usable to transform text of the documents into embedded document index entries of document indexes within the documents is obtained by a processor. Using the document index entry generation transforms defined within the contextual index item generation rules in association with a document that includes embedded document index entries that are both embedded at locations of associated text distributed throughout the document and added as part of a document index within the document, new text of the document is programmatically transformed into at least one new document index entry in response to determining that at least one portion of the new text includes candidate text that is not already indexed within the existing embedded document index entries and the document index within the document.

20 Claims, 7 Drawing Sheets

(56) References Cited

U.S. PATENT DOCUMENTS

| | | | |
|---|---|---|---|
| 5,347,653 A | | 9/1994 | Flynn et al. |
| 5,404,510 A | | 4/1995 | Smith et al. |
| 5,685,003 A | | 11/1997 | Peltonen et al. |
| 5,706,365 A | | 1/1998 | Rangarajan et al. |
| 5,708,825 A | * | 1/1998 | Sotomayor .......... G06F 17/2235 707/E17.013 |
| 5,845,305 A | | 12/1998 | Kujiraoka |
| 5,983,171 A | | 11/1999 | Yokoyama et al. |
| 6,003,043 A | | 12/1999 | Hatakeyama et al. |
| 6,014,663 A | * | 1/2000 | Rivette .................. G06F 17/24 707/690 |
| 6,094,649 A | | 7/2000 | Bowen et al. |
| 6,169,983 B1 | | 1/2001 | Chaudhuri et al. |
| 6,745,194 B2 | | 6/2004 | Burrows |
| 6,772,141 B1 | | 8/2004 | Pratt et al. |
| 7,853,595 B2 | | 12/2010 | Chew et al. |
| 8,433,560 B2 | | 4/2013 | Luke |
| 2002/0078045 A1 | | 6/2002 | Dutta |
| 2002/0152209 A1 | | 10/2002 | Merugu et al. |
| 2003/0220915 A1 | | 11/2003 | Fagan et al. |
| 2004/0024778 A1 | | 2/2004 | Cheo |
| 2004/0225963 A1 | | 11/2004 | Agarwal et al. |
| 2006/0041606 A1 | | 2/2006 | Sawdon |
| 2007/0179996 A1 | | 8/2007 | Azami |
| 2008/0178077 A1 | * | 7/2008 | Boucher ........... G06F 17/30728 715/266 |
| 2008/0184107 A1 | | 7/2008 | Chew et al. |
| 2009/0089277 A1 | * | 4/2009 | Cheslow ........... G06F 17/30684 |
| 2009/0112812 A1 | | 4/2009 | Ellis et al. |
| 2009/0164437 A1 | | 6/2009 | Torbjornsen |
| 2009/0248400 A1 | | 10/2009 | Luke |
| 2010/0005078 A1 | * | 1/2010 | Bayliss ............. G06F 17/30303 707/E17.014 |
| 2013/0103702 A1 | | 4/2013 | Solheim et al. |

OTHER PUBLICATIONS

United States Patent and Trademark Office, Office Action for U.S. Appl. No. 13/568,642, dated Mar. 11, 2014, pp. 1-15, Alexandria, VA, USA.

United States Patent and Trademark Office, Office Action for U.S. Appl. No. 13/568,642, dated Sep. 12, 2014, pp. 1-16, Alexandria, VA, USA.

United States Patent and Trademark Office, Office Action for U.S. Appl. No. 13/568,642, dated May 13, 2015, pp. 1-15, Alexandria, VA, USA.

United States Patent and Trademark Office, Notice of Allowance for U.S. Appl. No. 13/568,642, dated Sep. 15, 2015, pp. 1-5, Alexandria, VA, USA.

* cited by examiner

600

INCREMENTAL DYNAMIC DOCUMENT INDEX GENERATION

BACKGROUND

The present invention relates to document index generation. More particularly, the present invention relates to incremental dynamic document index generation.

Indexes may be associated with documents and provide a reader with a listing of content items (e.g., topics, etc.) within the respective documents. Indexes are often arranged to list the content items in alphabetical order with associated page numbers that indicate where the content items are located within the documents. Indexes are often placed at the end of a document.

SUMMARY

A method includes obtaining, by a processor, a contextual index compendium comprising contextual index item generation rules that define document index entry generation transforms usable to transform text of the documents into embedded document index entries of document indexes within the documents; and programmatically transforming, using the document index entry generation transforms defined within the contextual index item generation rules in association with a document that comprises embedded document index entries that are both embedded at locations of associated text distributed throughout the document and added as part of a document index within the document, new text of the document into at least one new document index entry in response to determining that at least one portion of the new text comprises candidate text that is not already indexed within the existing embedded document index entries and the document index within the document.

A system includes a memory and a processor programmed to: obtain a contextual index compendium comprising contextual index item generation rules that define document index entry generation transforms usable to transform text of the documents into embedded document index entries of document indexes within the documents; and programmatically transform, using the document index entry generation transforms defined within the contextual index item generation rules in association with a document that comprises embedded document index entries that are both embedded at locations of associated text distributed throughout the document and added as part of a document index within the document, new text of the document into at least one new document index entry in response to determining that at least one portion of the new text comprises candidate text that is not already indexed within the existing embedded document index entries and the document index within the document.

A computer program product includes a non-transitory computer readable storage medium having computer readable program code embodied therewith, where the computer readable program code when executed on a computer causes the computer to: obtain a contextual index compendium comprising contextual index item generation rules that define document index entry generation transforms usable to transform text of the documents into embedded document index entries of document indexes within the documents; and programmatically transform, using the document index entry generation transforms defined within the contextual index item generation rules in association with a document that comprises embedded document index entries that are both embedded at locations of associated text distributed throughout the document and added as part of a document index within the document, new text of the document into at least one new document index entry in response to determining that at least one portion of the new text comprises candidate text that is not already indexed within the existing embedded document index entries and the document index within the document.

DETAILED DESCRIPTION

Figure 1:
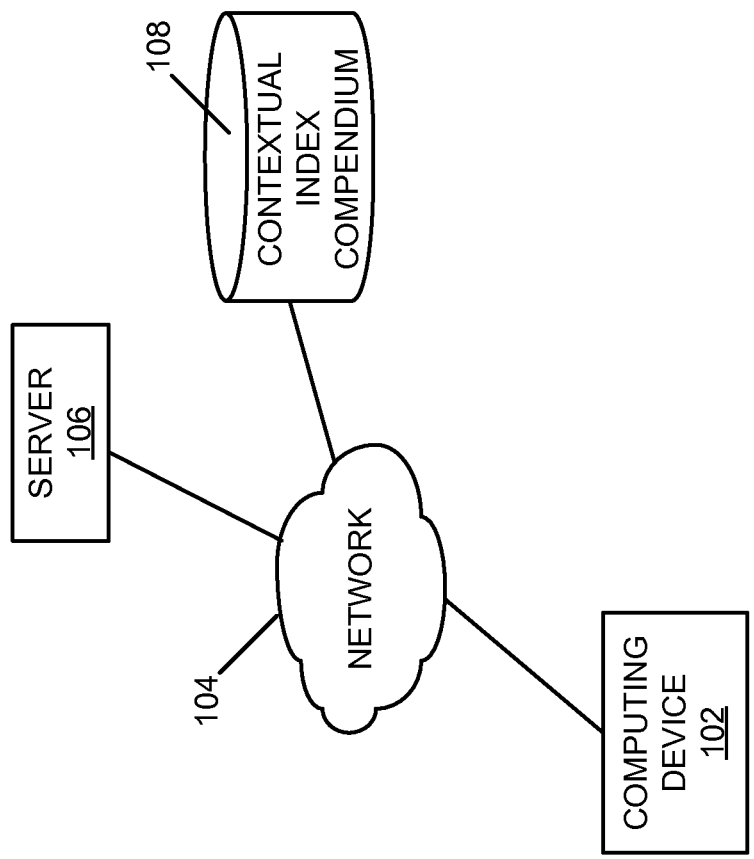
FIG. 1 is a block diagram of an example of an implementation of a system for automated incremental dynamic document index generation according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides incremental dynamic document index generation. The present technology implements text analysis of documents or text excerpts, and analysis of the context of text items within surrounding text to create a contextual index compendium. The contextual index compendium includes compendium items that represent rules for the creation of index items within documents that are derived programmatically from identified text (e.g., gerund verb and noun pairings, etc.) and context (surrounding words and/or index items) of that text within one or more actual documents. The contextual index compendium may be utilized to process documents for automated index item creation/suggestion. Users may review created compendium items and index item suggestions, and may accept, edit, delete, or otherwise modify the created items. Finalized index items may be embedded within a document and an index of the contents of the document may be generated using the finalized index items. A contextual index compendium may be created and utilized for each individual document, or may be shared and reused across documents.

As such, the present technology may be utilized to provide consistency across index developers and authors for one or more documents, and may be utilized to provide consistency for created index items over time as document revisions occur. Further, because of the incremental aspects of the dynamic document index generation described herein, the generated index may be viewed as document development occurs to gauge schedule compliance for document development during product development cycles.

The present technology may be executed in phases to perform the incremental dynamic document index generation described herein. The initial processing may include analyzing existing source documentation (e.g., one or more documents) and creation of the contextual index compendium. As described above, the contextual index compendium includes compendium items that include context rules for the creation of index items within documents that are derived programmatically from identified text (e.g., gerund verb and noun pairings, etc.) and context of that text within one or more actual documents. The context rules may be derived from context within existing documents for future indexing based upon previously-created indexes. Alternatively, the context rules may be initially configured using a document that is currently under development and refined during the course of document development. Further, consistency checks for usage of words/phrases may be implemented using the context rules described herein. For example, there may be certain circumstances where context of words within a document dictate the use of singular references (e.g., widget, construction), whereas context of the same base words within the same or another document or context may dictate the use of plural references (e.g., widgets, interaction). The context rules may further be configured to consider such circumstances with respect to consistency checks.

Additionally, index density guidelines/thresholds may be managed using context rules. As such, index density per quantity of text may be evaluated and managed to provide index distribution consistency (e.g., a normal statistical distribution) throughout a document. Alternatively, because the present subject matter utilizes context surrounding words/phrases for index analysis and creation, more complex subject matter may justify increased density of indexes, based upon the particular subject matter and as appropriate for a given implementation. In such circumstances, index density per quantity of text may be evaluated and managed to provide index distribution that varies based upon the level of detail associated with a particular topic (e.g., configurable deviations in index density based upon complexity/detail) throughout a document. It should be noted that many other possibilities exist for context rule creation and use and all are considered within the scope of the present subject matter.

As such, the contextual index compendium provides contextual reference information and rules so that index entries may be created for documents based upon word/phrase context within the documents. In this manner, the contextual index compendium may be used to transform a document and the text/context within that document into index entries/items that may be embedded within the document and thus added to an index. The contextual index compendium may also include usable verb/noun-based index items that may be reused during processing of multiple documents. Additionally, the author (alternatively referred to as the "user" herein) may review and fine-tune the contextual index compendium after initial creation of the contextual index compendium and over time to further influence automated incremental dynamic document index generation. Using the established contextual index compendium, the user may pass text (e.g., a modified document or a text excerpt of a document, etc.) to a dynamic index generation component/module for programmatic processing. The programmatic processing provides suggested index items, ready for insertion into the new source document. The user may further review and accept, reject, or modify the indexing suggestion results.

The initial processing phases to establish and fine-tune the contextual index compendium allow the user to filter and refine the information within the contextual index compendium to further improve the utility of the information contained within the contextual index compendium. The programmatic incremental dynamic document index generation and suggestion phase allows the user to retain control while improving efficiency of both document and index generation.

The present technology applies to any document type for source file(s) where index items are embedded into the source of the actual files/documents. For example, the present technology may be applied to document types such as structured generalized markup language (SGML), word processing documents with embedded index items, or other document types as appropriate for a given implementation.

Index items may be incrementally created and incrementally embedded into a document programmatically by the technology described herein as text material is added incrementally to the document by the author/user. As such, authors may stay focused on text generation for the document under edit without concerns of index generation during or after editing, while retaining the ability to review and approve the generated index items at the author's convenience.

It should be noted that the granularity of application of the present technology may be configured to operate on larger or smaller additions to a document, as appropriate for a given implementation. As such, the new text material may constitute either large or small portions of the overall document for which an index is being incrementally updated.

Regarding the analysis of existing source documentation and creation of the contextual index compendium, the present technology extracts index item information and context information (especially associated heading information) from the source text of a document. From this extracted information, the words in the index item are classified. In general terms, example classifications are "entry," "modifier," and "action," though others may be used as appropriate for a given implementation. An entry is not necessarily one word, it could (and often is) a word cluster. However, each word that is in an index item is stored, with an indication of how it has been used in context. This information is stored in the contextual index compendium (e.g., as a file, database record, etc.) that is readable and editable (e.g., as text or in a format supported by a word processing package).

Regarding user review and fine-tune of the contextual index compendium after initial creation of the contextual index compendium and over time, the user may open the contextual index compendium file or access the contextual index compendium records within an contextual index compendium database, and reviews the contents. Individual contextual index compendium items may be deleted, edited, or left within the contextual index compendium as created. It should be noted that editing a contextual index compendium item to optionally indicate that the item is of a lesser importance rating may provide more useable information than deleting the entry to preserve the importance rating and guide future index generation sessions. A user may also add new entries to prime the contextual index compendium for further additions to the source documents.

Regarding processing of a document and automated generation of index item suggestions, processing may begin by obtaining the contextual index compendium file or accessing the contextual index compendium database in response to a user request (e.g., beginning a document editing session or in response to a specific user input via a menu-based, user interface dialog box, or keyboard input entry). For a remote access situation, the contextual index compendium or its contents may be stored locally (e.g., cached) to expedite document analysis.

Processing of edited/added text for index item suggestion may be performed responsive to editing operations (e.g., a "save" instruction or otherwise). Alternatively, when a user wishes to generate new index items, the user may copy the relevant text to the clipboard associated with the computing device/word processing program, and may initiate document analysis, either as configured responsive to the clipboard copy operation or in response to a different (e.g., menu-based, user interface dialog box, or keyboard input entry) command initiation. In response to initiation of text analysis, the text is analyzed and one or more index items/suggestions are created. The user may then review the suggested index items. The user may edit the suggested index items or accept the index items as suggested to finalize the index items for integration into the document.

The user may integrate the finalized index items in a variety of ways. For example, the user may paste (e.g., from the clipboard) the finalized index items into the document, or use some other means to insert the finalized index items at the appropriate place within the document. For example, the user may initiate automated integration of the finalized index items as embedded index items at the locations within the document associated with the analyzed text. Many other variations for index integration/embedding into the document are possible and all are considered within the scope of the present subject matter.

It should be noted that if a situation results where the index generation has difficulty identifying a manner in which words are used within the analyzed text, the present technology may seek guidance from the user. In such a situation, as this information is supplied, the contextual index compendium file or database may be updated with the user's guidance to allow the contextual index compendium to grow over time with respect to its text analysis capabilities and for the generation of text processing and index generation rules. As such, over time, as the contextual index compendium grows in its processing complexity and capabilities, less user input for guidance may be utilized.

It should be noted that contextual index compendiums may be associated with specific documents to support highly-technical subject matter. Alternatively, contextual index compendiums may be reused across documents and/or subject matter areas as appropriate for a given implementation.

Additionally, an existing contextual index compendium may be utilized to analyze previously-created documents and indexes. As such, processing of existing source documents may be performed to suggest additional/alternative index items, or to flag items that may be inconsistent with the rules embedded in the contextual index compendium. As such, the present technology may improve indexes and documentation for both new and existing documents.

As described above and in more detail below, the present technology may be utilized to speed up the process of creating/updating index items, and to provide a higher level of consistency across index developers and across document revision processes over time. Because the process is programmatically implemented, it may be performed faster than possible via manual index item entry and may demand less typing by a user/writer. Additionally, the present technology provides for user/writer interaction, to allow processing oversight by the user (or other personnel) to ensure that meaningful index items are created.

It should be noted that conception of the present subject matter resulted from recognition of certain limitations associated with document index generation and maintenance. For example, it was observed that when technical writers create new material to be added to existing documents, such as structured generalized markup language (SGML) or word processing documents, the technical writers or dedicated index generating personnel (e.g., index editors) must embed index items into the new material. These embedded index items are used to index the new material when the final updated document is produced. It was additionally observed that when technical writers edit existing documents and modify existing text, personnel must often modify the embedded index items accordingly. It was further observed that writers that are inexperienced in the creation of index items may create index items that are inconsistent with existing index items within an existing index or may create index items that are inconsistent with the existing index items created by other writers. It was further observed that experienced writers may find the process of index entry tedious (e.g., because index item entry tends to follow a set pattern that detracts from the creative aspects of writing), and that, as a result, even experienced writers may enter index items that are inconsistent with other index items in the existing index or may inadvertently omit index items that would be useful to a reader. As such, it was determined that index items created using these conventional writer-originated approaches may not provide the reader of the document with a meaningful pointer to the new information. It was further observed that existing approaches to indexing of documents operate on completed documents. It was determined from this observation that these existing approaches do not provide a way for the writer to embed index items in real time as document content/information is developed. It was further determined that, as such, these solutions require the writer to operate on content for indexing at a different time from when the content was developed, resulting in inefficiency for the writer with respect to the creation of index items. The present subject matter improves document index generation and maintenance by providing for automated incremental dynamic document index generation, as described above and in more detail below.

The incremental dynamic document index generation described herein may be performed in real time to allow prompt generation of updates to an existing index in response to updates to the document for which the index is generated. For purposes of the present description, real time shall include any time frame of sufficiently short duration as to provide reasonable response time for information processing acceptable to a user of the subject matter described.

Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for automated incremental dynamic document index generation. A computing device 102 communicates via a network 104 with a server 106. The server 106 and/or the computing device 102 may access a contextual index compendium 108 for creation of compendium items within the contextual index compendium and for document processing to generate index items and/or index items suggestions for the processed document(s).

As will be described in more detail below in association with FIG. 2 through FIG. 6B, the computing device 102 and/or the server 106 provide automated incremental dynamic document index generation. The automated incremental dynamic document index generation is based upon contextual analysis of text within one or more documents to create data within the contextual index compendium and for document processing for index creation using the contextual index compendium. As such, a variety of possibilities exist for implementation of the present subject matter, and all such possibilities are considered within the scope of the present subject matter.

It should be noted that any of the respective computing devices described in association with FIG. 1 may be portable computing devices, either by a user's ability to move the respective computing devices to different locations, or by the respective computing device's association with a portable platform, such as a plane, train, automobile, or other moving vehicle. It should also be noted that the respective computing devices may be any computing devices capable of processing information as described above and in more detail below. For example, the respective computing devices may include devices such as a personal computer (e.g., desktop, laptop, etc.) or a handheld device (e.g., cellular telephone, personal digital assistant (PDA), email device, music recording or playback device, etc.), a web server, application server, or other data server device, or any other device capable of processing information as described above and in more detail below.

The network 104 may include any form of interconnection suitable for the intended purpose, including a private or public network such as an intranet or the Internet, respectively, direct inter-module interconnection, dial-up, wireless, or any other interconnection mechanism capable of interconnecting the respective devices.

Figure 2:
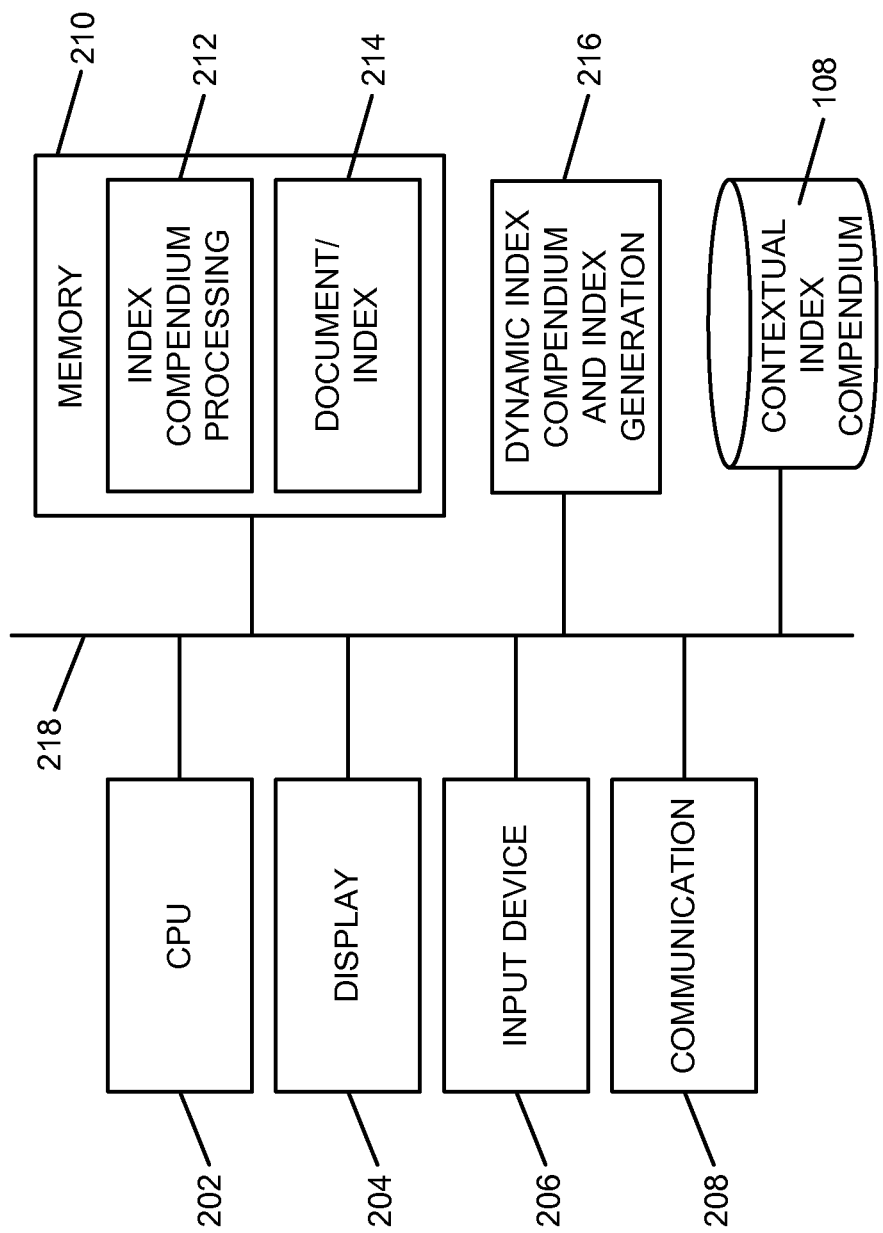
FIG. 2 is a block diagram of an example of an implementation of a core processing module capable of performing automated incremental dynamic document index generation according to an embodiment of the present subject matter.

FIG. 2 is a block diagram of an example of an implementation of a core processing module 200 capable of performing automated incremental dynamic document index generation. The core processing module 200 may be associated with the computing device 102 and/or with the server 106, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of compendium items and index items in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, or any other type of input device by which the user may interact with and respond to information on the display 204.

It should be noted that the display 204 and the input device 206 may be optional components for the core processing module 200 for certain implementations/devices (e.g., at a server device such as the server 106). Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides interconnection capabilities that allow the core processing module 200 to communicate with other modules within the system 100. The communication module 208 may include any electrical, protocol, and protocol conversion capabilities useable to provide the interconnection capabilities appropriate for a given implementation.

A memory 210 includes an index compendium processing storage area 212 that stores information used during the creation of compendium items and index items by the core processing module 200. As described above, compendium items may include text processing rules, identifiable context used by the respective text processing rules, index entry results associated with the respective text processing rules, and other information used to create and maintain a contextual index compendium and index items for embedding within documents. A document/index storage area 214 stores one or more documents for processing to create contextual index compendiums and/or compendium items, and to create index items and indexes for the respective documents.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A dynamic index compendium and index generation module 216 is also illustrated. The dynamic index compendium and index generation module 216 provides document text processing and analysis for compendium generation and maintenance, and for index item creation and processing within the core processing module 200, as described above and in more detail below. The dynamic index compendium and index generation module 216 implements the automated incremental dynamic document index generation of the core processing module 200.

It should also be noted that the dynamic index compendium and index generation module 216 may form a portion of other circuitry described without departure from the scope of the present subject matter. Further, the dynamic index compendium and index generation module 216 may alternatively be implemented as an application stored within the memory 210. In such an implementation, the dynamic index compendium and index generation module 216 may include instructions executed by the CPU 202 for performing the functionality described herein. The CPU 202 may execute these instructions to provide the processing capabilities described above and in more detail below for the core processing module 200. The dynamic index compendium and index generation module 216 may form a portion of an interrupt service routine (ISR), a portion of an operating system, a portion of a browser application, or a portion of a separate application without departure from the scope of the present subject matter.

The contextual index compendium database 108 is also shown associated with the core processing module 200 within FIG. 2 to show that the contextual index compendium database 108 may be coupled to the core processing module 200 without requiring external connectivity, such as via the network 104.

The CPU 202, the display 204, the input device 206, the communication module 208, the memory 210, the dynamic index compendium and index generation module 216, and the contextual index compendium database 108 are interconnected via an interconnection 218. The interconnection 218 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. It should also be understood that, though the contextual index compendium database 108 is illustrated as a separate component for purposes of example, the information stored within the contextual index compendium database 108 may also/alternatively be stored within the memory 210 without departure from the scope of the present subject matter. Accordingly, the core processing module 200 may take many forms and may be associated with many platforms.

FIG. 3 through FIG. 6B described below represent example processes that may be executed by devices, such as the core processing module 200, to perform the automated incremental dynamic document index generation associated with the present subject matter. Many other variations on the example processes are possible and all are considered within the scope of the present subject matter. The example processes may be performed by modules, such as the dynamic index compendium and index generation module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

Figure 3:
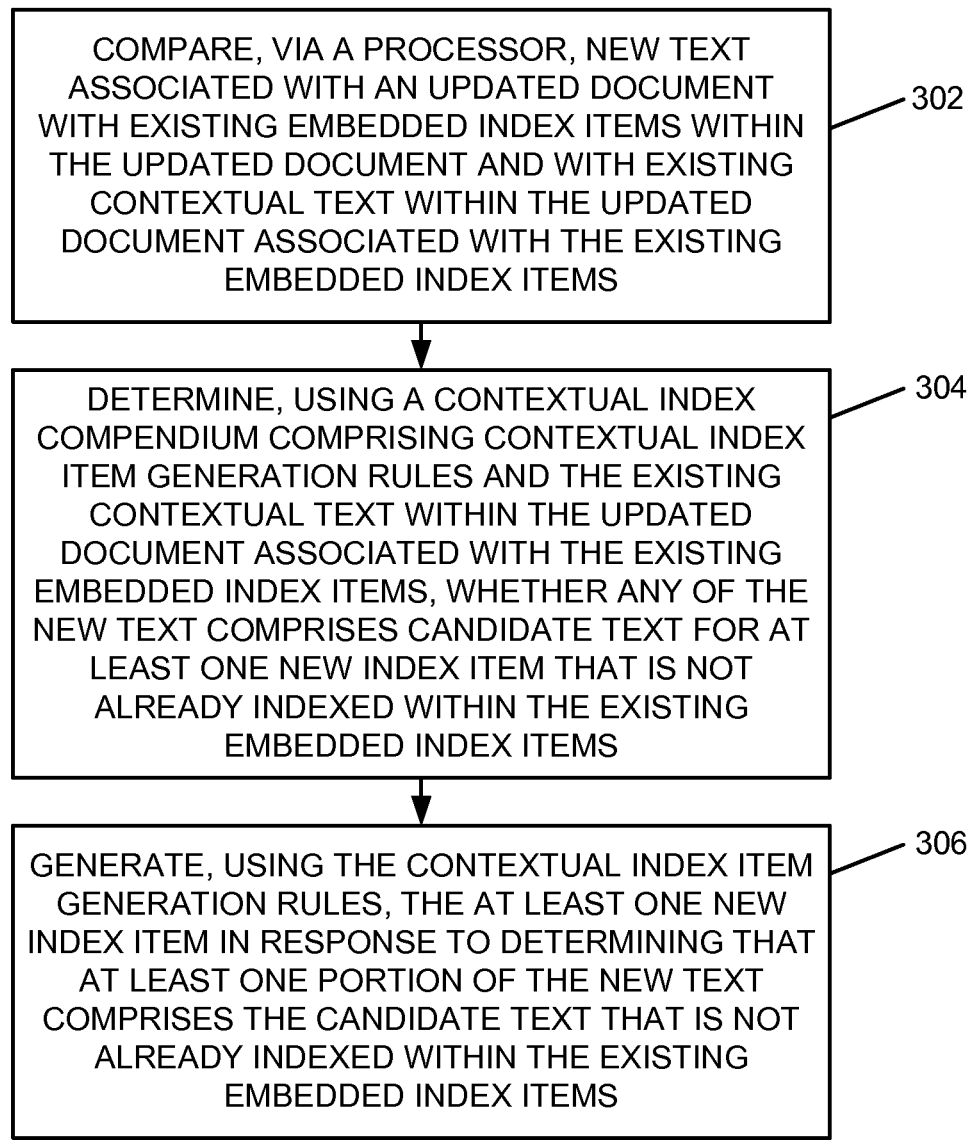
FIG. 3 is a flow chart of an example of an implementation of a process for automated incremental dynamic document index generation according to an embodiment of the present subject matter.

FIG. 3 is a flow chart of an example of an implementation of a process 300 for automated incremental dynamic document index generation. At block 302, the process 300 compares, via a processor, new text associated with an updated document with existing embedded index items within the updated document and with existing contextual text within the updated document associated with the existing embedded index items. At block 304, the process 300 determines, using a contextual index compendium comprising contextual index item generation rules and the existing contextual text within the updated document associated with the existing embedded index items, whether any of the new text comprises candidate text for at least one new index item that is not already indexed within the existing embedded index items. At block 306, the process 300 generates, using the contextual index item generation rules, the at least one new index item in response to determining that at least one portion of the new text comprises the candidate text that is not already indexed within the existing embedded index items.

Figure 4:
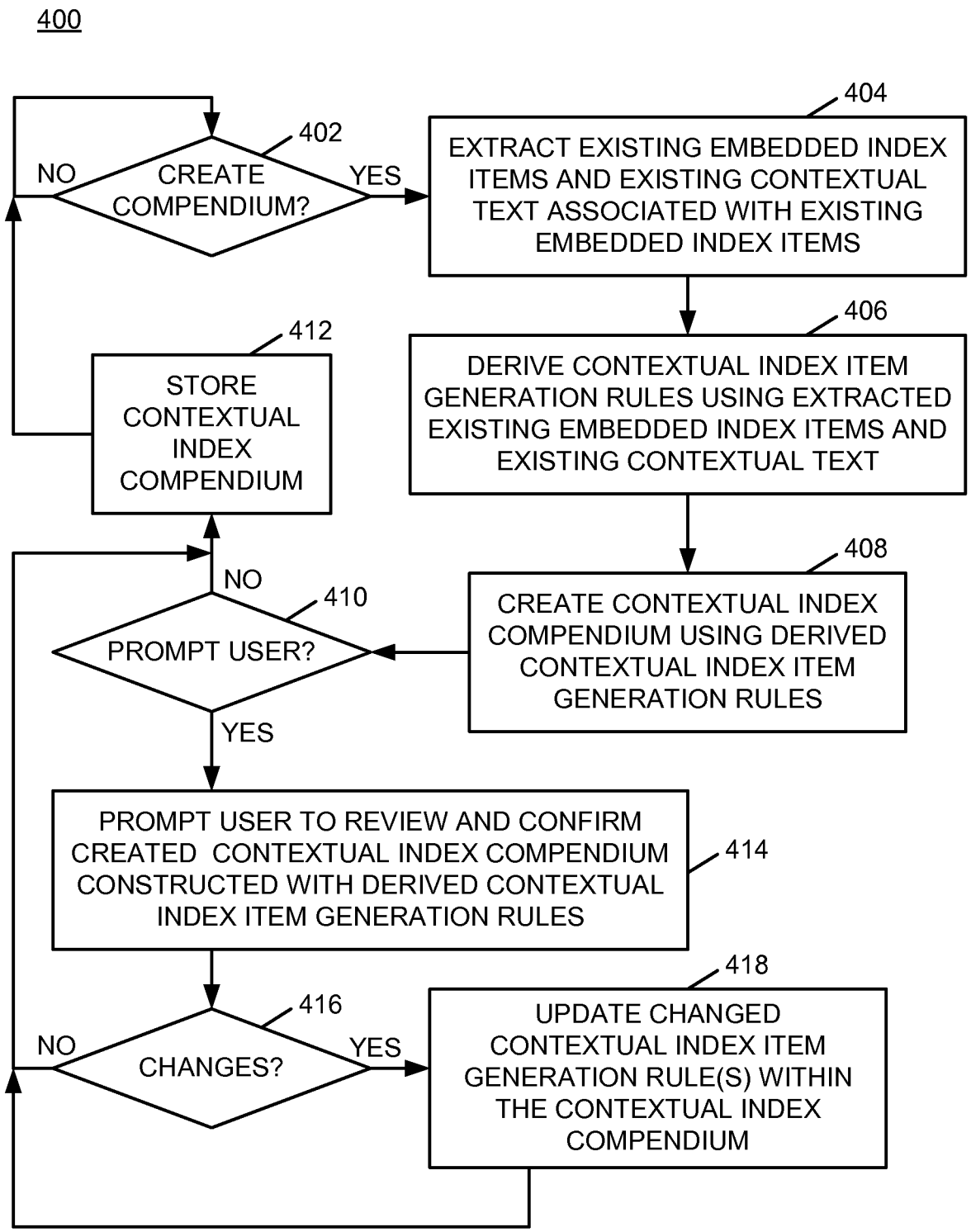
FIG. 4 is a flow chart of an example of an implementation of a process for automated contextual index compendium creation in association with incremental dynamic document index generation according to an embodiment of the present subject matter.

FIG. 4 is a flow chart of an example of an implementation of a process 400 for automated contextual index compendium creation in association with incremental dynamic document index generation. At decision point 402, the process 400 makes a determination as to whether a request to create a contextual index compendium for a document has been detected. It should be noted, that the document for which the contextual index compendium is to be created may be a new document or an updated document. Additionally, a contextual index compendium may be created on a document by document basis, or may be created using one document and stored for reuse to process other documents. Alternatively, if a user is starting a new document, and does not wish to use a compendium already created for another document, the user may create a compendium by providing "sample" index entries (and sample contextual index item generation rules usable to derive the index entries) to initially form the contextual index compendium. These sample index entries (and sample contextual index item generation rules) may be accepted into the compendium without the benefit of analysis of contextual information.

In response to determining that a request to create a contextual index compendium for a document has been detected at decision point 402, the process 400 extracts existing embedded index items and existing contextual text (e.g., surrounding text, footnotes, headnotes, etc.) associated with the existing embedded index items from a document at block 404. At block 406, the process 400 derives contextual index item generation rules using the extracted existing embedded index items within the document and the existing contextual text within the document associated with the existing embedded index items. Derivation of the contextual index item generation rules may be performed for example by analysis of the contextual text associated with each existing embedded index item and creating a transformation algorithm that characterizes the embedded index item relative to the contextual text. For example, the process 400 may look for nouns and verbs for indexing use within the contextual text and determine whether there is a mapping between identified nouns and/or verbs to the respective embedded index item. To further the present example, if an embedded index item is "widgets, creating" and the contextual text associated with this embedded index item is "a widget may be created by," then a mapping between the respective nouns and verbs of the embedded index item and the associated contextual text may be formed.

The mapping may be represented in any format suitable for a given implementation. One example mapping format for a contextual index item generation rule that utilizes a conditional statement may include the following pseudo syntax:

if verb is "created" and noun is "widget," then transform verb "created" to gerund verb format "creating" and transform singular noun "widget" to plural noun "widgets," with comma separation An alternative and more-general mapping for a contextual index item generation rule that also utilizes a conditional statement may include the following pseudo syntax:

if verb is "created" and singular noun identified, then transform verb "created" to gerund verb format "creating" and transform singular noun to plural noun, with comma separation The examples of pseudo syntax for contextual index item generation rules described above may be implemented programmatically in any format convenient for a given implementation. Further generalized and/or broadened contextual index item generation rules or more specific contextual index item generation rules may be generated as appropriate for a given implementation. As such, many possibilities exist for transformation mapping formats for contextual index item generation rules, and all such possibilities are considered within the scope of the present subject matter. Similar processing may be performed for each embedded index item to derive unique contextual index item generation rules using the contextual text associated with each embedded index item.

At block 408, the process 400 creates the contextual index compendium using the derived contextual index item generation rules. As such, a contextual index compendium may be created programmatically and without user intervention based upon existing embedded index items and existing contextual text within a document. However, user interaction to review and confirm, and/or edit, the created contextual index compendium may also be performed.

At decision point 410, the process 400 makes a determination as to whether to prompt the user to review and confirm, and/or edit, the created contextual index compendium or to utilize the derived contextual index item generation rules. In response to determining not to prompt the user to review and confirm, and/or edit, the created contextual index compendium, and to utilize the derived contextual index item generation rules, the process 400 stores the created contextual index compendium, such as within the contextual index compendium database 108, at block 412. The process 400 returns to decision point 402 and iterates as described above.

Returning to the description of decision point 410, in response to determining to prompt the user to review and confirm, and/or edit, the created contextual index compendium, the process 400 prompts the user to review and confirm the created contextual index compendium constructed with the derived contextual index item generation rules at block 414. At decision point 416, the process 400 makes a determination as to whether any user changes to the derived contextual index item generation rules within the created contextual index compendium have been detected. In response to determining that at least one user change to at least one derived contextual index item generation rule within the created contextual index compendium has been detected, the process 400 updates any changed contextual index item generation rule(s) within the contextual index compendium at block 418.

In response to updating any changed contextual index item generation rule(s) within the contextual index compendium at block 418, or in response to determining at decision point 416 that no user change to the derived contextual index item generation rules within the created contextual index compendium have been detected, the process 400 stores the contextual index compendium at block 412, such as within the contextual index compendium database 108, as described above. The process 400 returns to decision point 402 and iterates as described above.

As such, the process 400 provides automated processing to extract embedded index items and contextual text associated with existing embedded index items. The process 400 derives contextual index item generation rules using contextual text associated with the existing embedded index items. User input and editing are provided to allow flexibility of implementation for the derived contextual index item generation rules.

Figure 5:
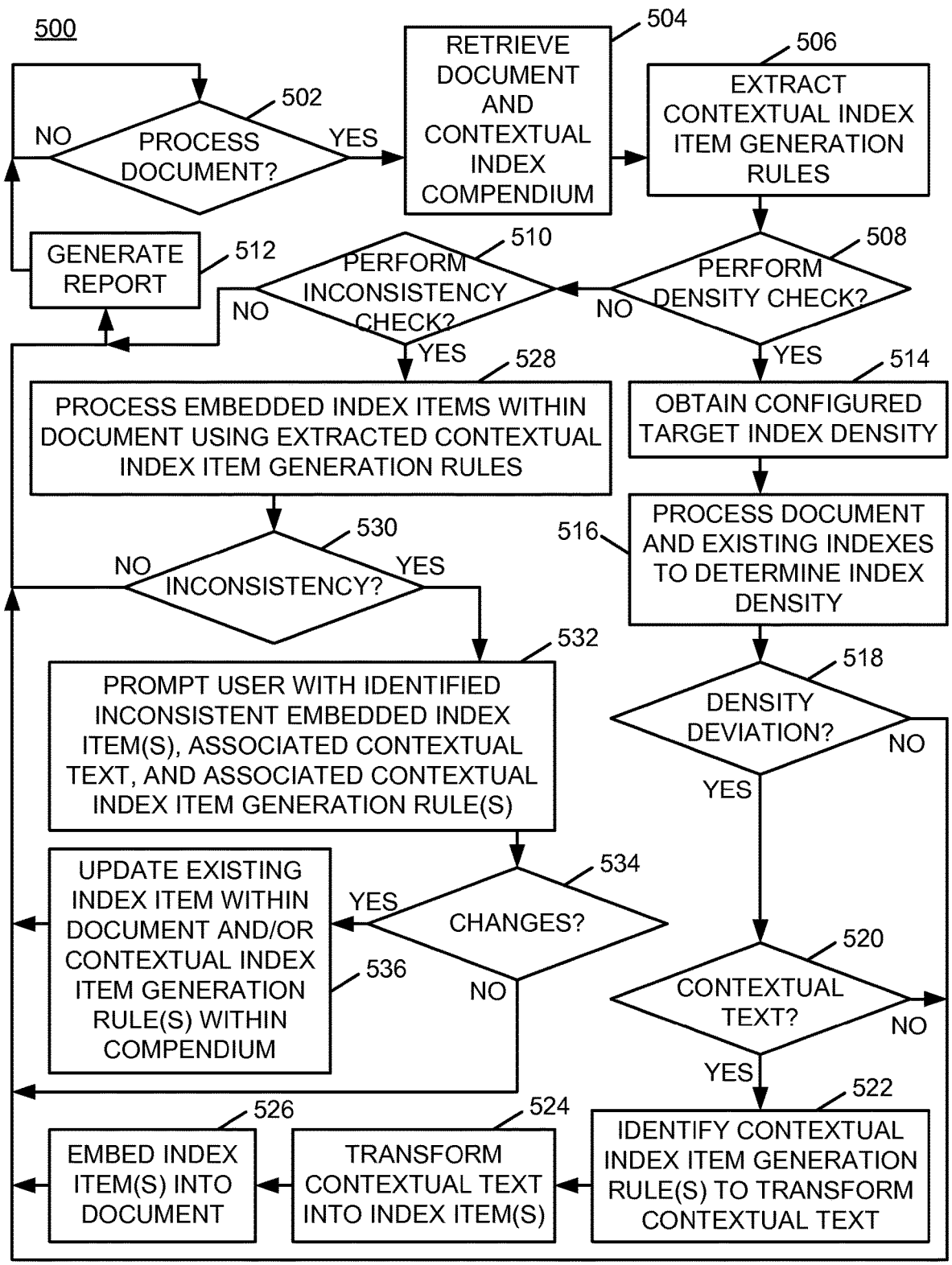
FIG. 5 is a flow chart of an example of an implementation of a process for automated index consistency processing in association with incremental dynamic document index generation according to an embodiment of the present subject matter.

FIG. 5 is a flow chart of an example of an implementation of a process 500 for automated index consistency processing in association with incremental dynamic document index generation. At decision point 502, the process 500 makes determination as to whether a request to process a document for consistency evaluation is been detected. In response to determining that a request to process a document for consistency evaluation is been detected, the process 500 retrieves the document and the contextual index compendium, such as from the document/index storage area 214 and the contextual index compendium database 108, respectively, at block 504.

At block 506, the process 500 extracts contextual index item generation rules from the retrieved contextual index compendium. At decision point 508, the process 500 makes a determination as to whether to perform an index density check of the document to evaluate index distribution throughout the document. An index density check may be performed to determine an index density per text quantity within the document, and to determine whether deviations associated with embedded index distribution within the document exist relative to a target/configured index density for the document. Contextual index item generation rules may further be formatted with the target/configured index density for the document, for groups of documents, or for any other scope of application as appropriate for a given implementation. Processing associated with an affirmative determination at decision point 508 will be deferred and described in more detail below in order to continue with the description of higher-level processing associated with the process 500.

As such, in response to determining not to perform an index density check of the document to evaluate index distribution throughout the document at decision point 508, the process 500 makes a determination at decision point 510 as to whether to perform an index inconsistency check on the document to evaluate consistency between the embedded indexes in the document and the currently-applicable contextual index item generation rules. An index inconsistency check may utilize contextual index item generation rules to determine embedded index items that do not comply with one or more contextual index item generation rules. Processing associated with an affirmative determination at decision point 510 will be deferred and described in more detail below in order to continue with the description of higher-level processing associated with the process 500.

As such, in response to determining not to perform an index inconsistency check on the document at decision point 510, the process 500 generates an embedded index report at block 512. The embedded index report may include information that identifies each embedded index item, and may also include mapping information that identifies contextual index item generation rules that are associated with any embedded index items. The process 500 returns to decision point 502 and iterates as described above.

Returning to the description of decision point 508, in response to determining perform an index density check of the document to evaluate index distribution throughout the document, the process 500 obtains a configured target index density, such as from one or more contextual index item generation rules, at block 514. At block 516, the process 500 processes the document and the existing embedded index items to determine an index density per text quantity within the document. At decision point 518, the process 500 makes a determination as to whether an index density deviation from a configured target index density exists within the document. In response to determining that no index density deviation from the configured target index density exists within the document, the process 500 returns to block 512 and generates an embedded index report that documents the compliant index density for the document. As described above, the embedded index report may also include information that identifies each embedded index item, and may also include mapping information that identifies contextual index item generation rules that are associated with any embedded index items. The process 500 returns to decision point 502 and iterates as described above.

Returning to the description of decision point 518, in response to determining that an index density deviation from a configured target index density exists within the document, the process 500 makes a determination at decision point 520, such as by use of an additional contextual index item generation rule, whether contextual text usable to create at least one suitable index item exists within the text of the document that is associated with the identified deviation from the configured target index density.

In response to determining that contextual text usable to create at least one suitable index item does not exist within the text of the document that is associated with the identified deviation from the configured target index density at decision point 520, the process 500 returns to block 512 and generates an embedded index report to document the index density deviation and that there is no usable contextual text to create a suitable index item for the text of the document associated with the index density deviation based upon the currently defined contextual index item generation rules. It should be noted that the process 500 may be modified to execute a process similar to the process 400 described above in association with FIG. 4 to derive a new contextual index item generation rule. Additionally, the process 500 may also be modified to prompt the user to allow real-time user interaction associated with identified index density deviations. This additional processing is considered to form a portion of the process 500, but has been omitted from the drawing figure to reduce complexity and crowding within the drawing figure. As described above, the embedded index report may also include information that identifies each embedded index item, and may also include mapping information that identifies contextual index item generation rules that are associated with any embedded index items. The process 500 returns to decision point 502 and iterates as described above.

Returning to the description of decision point 520, in response to determining that contextual text usable to create at least one suitable index item exists within the text of the document associated with the identified deviation from the configured target index density, the process 500 identifies a contextual index item generation rule(s) to transform the contextual text into an index item(s) at block 522. At block 524, the process 500 transforms the contextual text into one or more index items. At block 526, the process 500 embeds the created index item(s) into the document in association with the contextual text utilized/transformed to create the embedded index item(s).

The process 500 returns to block 512 and generates an embedded index report to document the creation and embedding of the respective index item(s). As described above, the embedded index report may also include information that identifies each embedded index item, and may also include mapping information that identifies contextual index item generation rules that are associated with any embedded index items.

Returning to the description of decision point 510, in response to determining to perform an index inconsistency check on the document to evaluate consistency between the embedded indexes in the document and the currently-applicable contextual index item generation rules, the process 500 processes the existing embedded index items within the document using the extracted contextual index item generation rules within the contextual index compendium at block 528. Within this portion of the present example, the contextual index item generation rules are configured to perform consistency checks among the existing embedded index items.

At decision point 530, the process 500 makes determination as to whether any embedded index item inconsistency with respect to any contextual index item generation rule has been identified. In response to determining that no embedded index item inconsistency has been identified with respect to any contextual index item generation rule, the process 500 returns to block 512 to generate an embedded index report to document any/no identified inconsistencies of the embedded index items with the contextual index item generation rules. As described above, the embedded index report may also include information that identifies each embedded index item, and may also include mapping information that identifies contextual index item generation rules that are associated with any embedded index items. The process 500 returns to decision point 502 and iterates as described above.

Returning to the description of decision point 530, in response to determining that at least one inconsistent embedded index item has been identified relative to at least one contextual index item generation rule, the process 500 prompts a user at block 532 with the identified inconsistent embedded index item(s), the contextual text within the document associated with the identified inconsistent embedded index item, and the contextual index item generation rule(s) that transforms the associated contextual text within the document to at least one identified inconsistent embedded index item.

At decision point 534, the process 500 makes a determination as to whether any user changes have been detected. For example, a user may enter updated index item(s) and/or may enter an updated contextual index item generation rule(s) that transforms the respective identified inconsistent index item from the contextual text within the updated document to the updated index item. In response to determining that at least one change to one or more inconsistent embedded index item(s) and/or one or more contextual index item generation rule(s) by the user has been detected, at block 536 the process 500 updates the respective inconsistent embedded index item(s) to the updated index item(s) within the document and/or updates the respective contextual index item generation rule(s) to the updated contextual index item generation rule(s) within the contextual index compendium.

In response to performing the updates of any inconsistent embedded index item(s) within the document and/or performing the updates to the respective contextual index item generation rule(s) within the contextual index compendium at block 536, or in response to determining at decision point 534 that no user changes have been detected, the process 500 returns to block 512 to generate an embedded index report to document any identified inconsistencies of the embedded index items with the contextual index item generation rules, and any updates/changes entered by user. As described above, the embedded index report may also include information that identifies each embedded index item, and may also include mapping information that identifies contextual index item generation rules that are associated with any embedded index items. The process 500 returns to decision point 502 and iterates as described above.

Figure 6A:
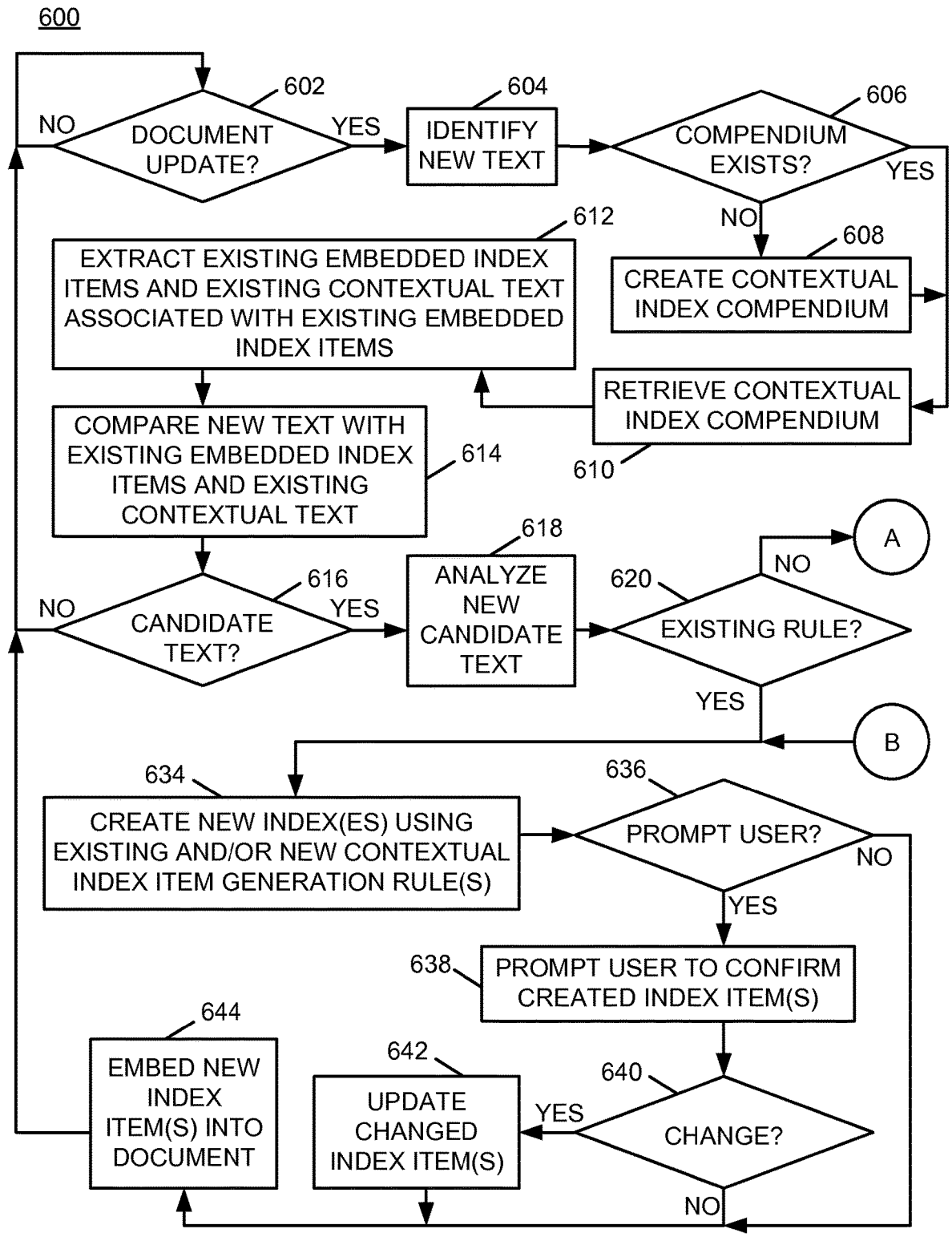
FIG. 6A is a flow chart of an example of an implementation of initial processing within a process for automated document update processing in association with incremental dynamic document index generation according to an embodiment of the present subject matter.
Figure 6B:
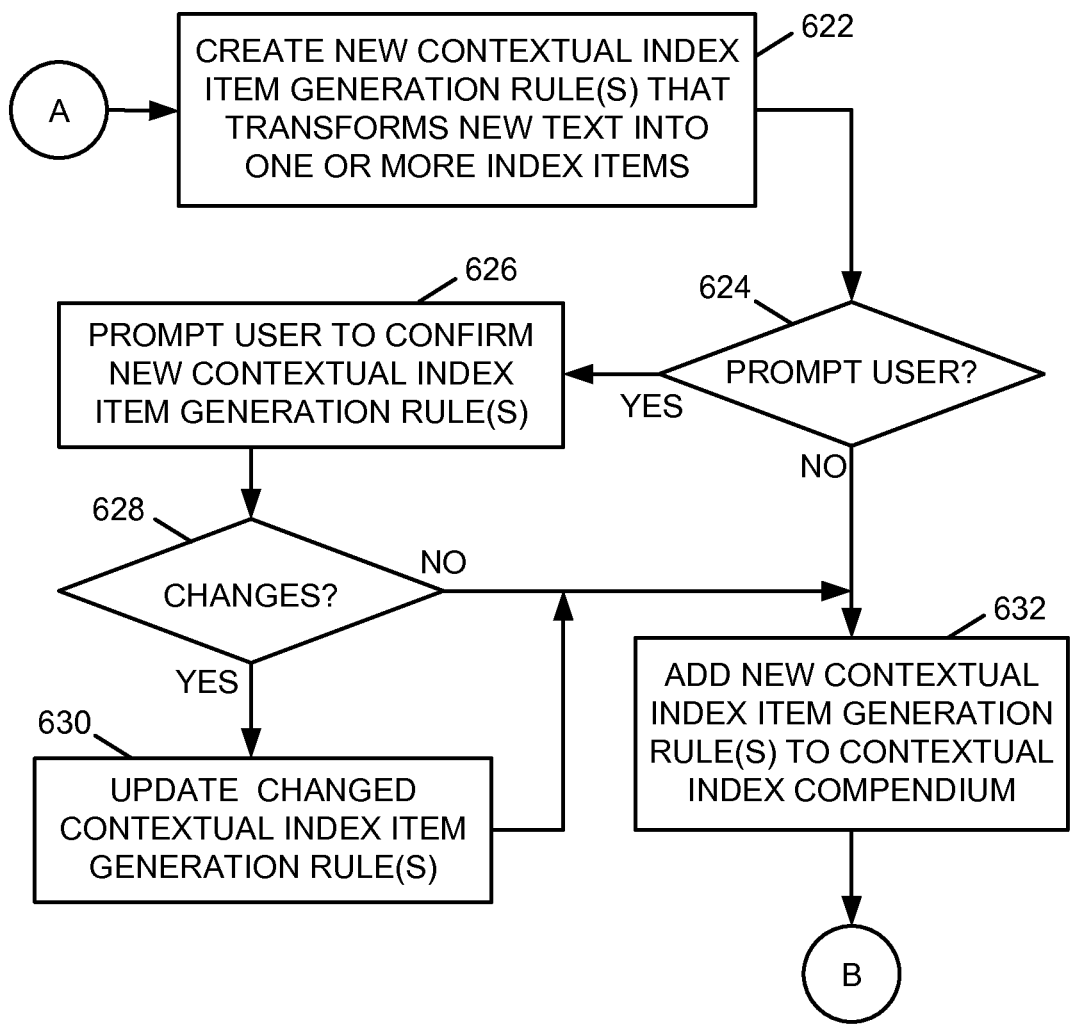
FIG. 6B is a flow chart of an example of an implementation of additional processing within a process for automated document update processing in association with incremental dynamic document index generation according to an embodiment of the present subject matter.

As such, the process 500 performs a variety of checks on embedded index items relative to contextual index item generation rules. For purposes of the present example, density deviation checks for index density per text quantity within a document and consistency checks for inconsistency of any embedded index items relative to contextual index item generation rules have been described. The user may be prompted with any identified deviations and/or inconsistencies, and updates may be entered by the user and propagated to the contextual index compendium. It is understood that many other possibilities exist for checks associated with the contextual index item generation rules described herein, and all such possibilities are considered within the scope of the present subject matter FIGS. 6A-6B illustrate a flow chart of an example of an implementation of process 600 for automated document update processing in association with incremental dynamic document index generation. FIG. 6A illustrates initial processing within the process 600. At decision point 602, the process 600 makes a determination as to whether a document update has been detected. A document update may be detected in response to a save operation for a document (e.g., such as a CTRL-S key pair, or a save menu selection). Alternatively, a document update may be detected in response to a copy operation of text to the clipboard and a menu selection, such as a pop-up menu selection, associated with clipboard processing. Alternatively, a document update may be detected in response to a request by user to scan a document for embedded index density, and a document update may be identified in association with an index density deviation. As such, many possibilities exist for detecting a document update and all are considered within the scope of the present subject matter.

In response to determining at decision point 602 that a document update has been detected, the process 600 identifies new text associated with the document update at block 604. At decision point 606, the process 600 makes determination as to whether a contextual index compendium exists, such as within the contextual index compendium database 108. As described above, the contextual index compendium may be document specific and formed using the document to further process the same document as document revisions occur. Alternatively, contextual index compendiums may be generated and utilized to process multiple documents to ensure embedded index item consistency across document development groups. Many other applications for contextual index compendium usage exist and all such applications are considered within the scope of the present subject matter.

In response to determining that a contextual index compendium does not exist at decision point 606, the process 600 creates a contextual index compendium, such as by use of the process 400 described in association with FIG. 4 above, at block 608. In response creating the contextual index compendium at block 608, or in response to determining that a contextual index compendium already exists at decision point 606, the process 600 retrieves the contextual index compendium at block 610.

At block 612, the process 600 extracts existing embedded index items and existing contextual text (e.g., surrounding text, footnotes, headnotes, etc.) associated with the existing embedded index items from the document. At block 614, the process 600 compares the identified new text associated with the updated document with existing embedded index items within the updated document and with existing contextual text within the updated document associated with the existing embedded index items.

At decision point 616, the process 600 makes a determination, using the contextual index compendium, the contextual index item generation rules, and the contextual text within the updated document associated with the existing embedded index items, as to whether any of the new text comprises candidate text for at least one new index item that is not already indexed within the existing embedded index items. In response to determining that no candidate text for at least one new index item exists within the new text, the process 600 returns to decision point 602 and iterates as described above.

In response to determining that candidate text for at least one new index item does exist within the new text at decision point 616, the process 600 analyzes the new text within the updated document at block 618. At decision point

620, the process 600 makes a determination as to whether at least one existing contextual index item generation rule exists within the contextual index compendium to transform the new text into at least one new index item. Processing for an affirmative determination at decision point 620 will be deferred and described in more detail below.

As such, in response to determining at decision point 620 that at least one contextual index item generation rule does not exist within the contextual index compendium to transform the new text into at least one new index item, the process 600 transitions to the processing shown and described in association with FIG. 6B.

FIG. 6B illustrates additional processing associated with the process 600 for automated document update processing in association with incremental dynamic document index generation. At block 622, the process 600 creates at least one new contextual index item generation rule that transforms the new text into at least one new index item using contextual information within the new text.

At decision point 624, the process 600 makes a determination as to whether to prompt the user to confirm the newly-created contextual index item generation rule(s). In response to determining at decision point 624 to prompt the user to confirm the newly-created contextual index item generation rule(s), the process 600 prompts the user to confirm the newly-created contextual index item generation rule(s) at block 626. At decision point 628, the process 600 makes a determination as to whether any changes to the newly-created contextual index item generation rule(s) by the user have been detected. In response to determining that at least one change to the newly-created contextual index item generation rule(s) by the user is been detected, the process 600 updates any changed contextual index item generation rule(s) at block 630.

In response to updating any changed contextual index item generation rule(s) at block 630, or in response to determining at decision point 628 that no changes to the newly-created contextual index item generation rule(s) by the user have been detected, or in response to determining at decision point 624 not to prompt the user to confirm the newly-created contextual index item generation rule(s), the process 600 adds at least one new contextual index item generation rule to the contextual index compendium at block 632. As such, the process may create one or more new index items using any created new contextual index item generation rules, as described in more detail below.

The process 600 transitions back to the processing described in association with FIG. 6A. At block 634, the process 600 creates at least one new index item using either one or more existing contextual index item generation rules and/or one or more newly-created contextual index item generation rules.

At decision point 636, the process 600 makes a determination as to whether to prompt the user to confirm the newly-created index item(s). In response to determining to prompt the user to confirm the newly-created index item(s), the process 600 prompts the user to confirm the newly-created index item(s) at block 638. At decision point 640, the process 600 makes a determination as to whether any changes to the newly-created index item(s) by the user have been detected. In response to determining that at least one change to the newly-created index item(s) by the user is been detected, the process 600 updates any changed index item(s) at block 642.

In response to updating any changed index item(s) at block 642, or in response to determining at decision point 640 that no changes to the newly-created index item(s) by the user have been detected, or in response to determining at decision point 636 not to prompt the user to confirm the newly-created index item(s), the process 600 embeds the new index item(s) into the updated document at block 644. The process 600 returns to decision point 602 and iterates as described above As such, process 600 generates, using contextual index item generation rules within a contextual index compendium, new index items in response to determining that new text associated with an updated document includes candidate text that is not already indexed within the existing embedded index items. New contextual index item generation rules may be created using contextual text associated with the new text within the updated document. The user may be prompted to interact with the process 600 to confirm and or update new contextual index item generation rules and new indexes associated with the new text within the updated document. The new indexes may be embedded into the updated document in association with the new text. It should be noted, as described above, that processing to determine document consistency such as that described above in association with the process 500 of FIG. 5 may also be performed in association with the addition of new index items to an updated document. As such, many variations on the example processes and many opportunities for interoperation between the respective example processes may be utilized as appropriate for a given implementation.

As described above in association with FIG. 1 through FIG. 6B, the example systems and processes provide incremental dynamic document index generation. Many other variations and additional activities associated with incremental dynamic document index generation are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   by a processor:
   obtaining a contextual index compendium comprising contextual index item generation rules that define computer-executable document index entry generation transforms that when executed transform text of a document via one or more executed text modifications and incrementally in real time, as the text within the document is entered, into embedded document index entries that as modified are: (i) inserted into and distributed throughout the document as part of structural syntax of the document near the text and (ii) pointed to within the document from a document index that forms a portion of the document; and
   programmatically transforming, via the one or more executed text modifications and incrementally in real time in response to detecting entry of new text into the document by executing at least one of the computer-executable document index entry generation transforms defined within the contextual index item generation rules, the detected new text into at least one new document index entry that are each as modified from the detected new text (i) inserted into the document near a location of the detected new text and (ii) added within the document index as a new index item that points to the respective inserted new document index entry,
   wherein at least one of the document index entry generation transforms, when executed, transforms at least one of:
   a position of a word within the text relative to other words in the text, and
   a grammatical format of the word.

2. The method of claim 1, where programmatically transforming, via the one or more executed text modifications and incrementally in real time in response to detecting the entry of the new text into the document by executing the at least one of the computer-executable document index entry generation transforms defined within the contextual index item generation rules, the detected new text into the at least one new document index entry comprises the processor:
   analyzing the detected new text of the document in response to detecting the entry of the new text into the document;
   determining whether at least one contextual index item generation rule exists within the contextual index compendium that comprises a computer-executable document index entry generation transform executable to transform the detected new text via the one or more executed text modifications into the at least one new document index entry; and
   in response to determining that the at least one contextual index item generation rule exists within the contextual index compendium that comprises the computer-executable document index entry generation transform executable to transform the detected new text via the one or more executed text modifications into the at least one new document index entry:
   programmatically creating, by processing the detected new text as a new contextual text input using the computer-executable document index entry generation transform, the at least one new document index entry by modifying the new contextual text input into the at least one new document index entry; and
   further comprising the processor:
   inserting the at least one new document index entry within the structural syntax of the document near the location of the detected new text; and
   adding the at least one new document index entry to the document index as the new index item that operates as a contextual pointer to the location of the detected new text within the document.

3. The method of claim 1, further comprising the processor, in response to determining that at least one contextual index item generation rule does not exist within the contextual index compendium that comprises the computer-executable document index entry generation transform to transform the detected new text via the one or more executed text modifications into the at least one new document index entry:
   creating a new contextual index item generation rule that comprises the computer-executable document index entry generation transform that when executed transforms the detected new text via the one or more executed text modifications into the at least one new document index entry using contextual information derived from at least one of additional text, footnotes, and headnotes that surround the detected new text within the document;
   adding the new contextual index item generation rule to the contextual index compendium; and
   creating the at least one new document index entry using the computer-executable document index entry generation transform created within the new contextual index item generation rule.

4. The method of claim 1, further comprising the processor:
   comparing the detected new text of the document with each of existing embedded document index entries structurally located near the detected new text within the document and with existing contextual text located near the existing embedded document index entries within the document from which the existing embedded document index entries were created; and
   determining, using each of the computer-executable document index entry generation transforms and the existing contextual text located near the existing embedded document index entries within the document from which the existing embedded document index entries were created, whether any of the detected new text comprises candidate text that is not already indexed within the existing embedded document index entries and the document index within the document.

5. The method of claim 1, further comprising the processor:
   deriving the contextual index item generation rules in accordance with analysis of existing embedded document index entries within the document and existing contextual text located within the document from which the existing embedded document index entries within the document were created; and creating the contextual index compendium using the derived contextual index item generation rules.

6. The method of claim 1, where the contextual index item generation rules of the obtained contextual index compendium further define computer-executable consistency checks for usage of words and phrases among the embedded document index entries distributed throughout the document, and further comprising the processor:
performing an inconsistency check on the usage of words and phrases among the embedded document index entries distributed throughout the document using the computer-executable consistency checks defined within the contextual index item generation rules.

7. The method of claim 1, where the contextual index item generation rules of the obtained contextual index compendium further define a configured variable target document index entry distribution density that varies embedded document index entry density within the document according to a level of detail within text of the document, and further comprising the processor:
performing an embedded document index entry density check on the embedded document index entries distributed throughout the document using the configured variable target document index entry distribution density defined within the contextual index item generation rules.

8. A system, comprising:
a memory; and
a processor programmed to:
obtain a contextual index compendium comprising contextual index item generation rules that define computer-executable document index entry generation transforms that when executed transform text of a document via one or more executed text modifications and incrementally in real time, as the text within the document is entered, into embedded document index entries that as modified are: (i) inserted into and distributed throughout the document as part of structural syntax of the document near the text and (ii) pointed to within the document from a document index that forms a portion of the document; and
programmatically transform, via the one or more executed text modifications and incrementally in real time in response to detecting entry of new text into the document by executing at least one of the computer-executable document index entry generation transforms defined within the contextual index item generation rules, the detected new text into at least one new document index entry that are each as modified from the detected new text (i) inserted into the document near a location of the detected new text and (ii) added within the document index as a new index item that points to the respective inserted new document index entry,
wherein at least one of the document index entry generation transforms, when executed, transforms at least one of:
a position of a word within the text relative to other words in the text, and
a grammatical format of the word.

9. The system of claim 8, where in being programmed to programmatically transform, via the one or more executed text modifications and incrementally in real time in response to detecting the entry of the new text into the document by executing the at least one of the computer-executable document index entry generation transforms defined within the contextual index item generation rules, the detected new text into the at least one new document index entry, the processor is programmed to:
analyze the detected new text of the document in response to detecting the entry of the new text into the document;
determine whether at least one contextual index item generation rule exists within the contextual index compendium that comprises a computer-executable document index entry generation transform executable to transform the detected new text via the one or more executed text modifications into the at least one new document index entry;
in response to determining that the at least one contextual index item generation rule exists within the contextual index compendium that comprises the computer-executable document index entry generation transform executable to transform the detected new text via the one or more executed text modifications into the at least one new document index entry:
programmatically create, by processing the detected new text as a new contextual text input using the computer-executable document index entry generation transform, the at least one new document index entry by modifying the new contextual text input into the at least one new document index entry;
in response to determining that the at least one contextual index item generation rule does not exist within the contextual index compendium that comprises the computer-executable document index entry generation transform to transform the detected new text via the one or more executed text modifications into the at least one new document index entry:
create a new contextual index item generation rule that comprises the computer-executable document index entry generation transform that when executed transforms the detected new text via the one or more executed text modifications into the at least one new document index entry using contextual information derived from at least one of additional text, footnotes, and headnotes that surround the detected new text within the document;
add the new contextual index item generation rule to the contextual index compendium; and
create the at least one new document index entry using the computer-executable document index entry generation transform created within the new contextual index item generation rule; and
where the processor is further configured to:
insert the at least one new document index entry within the structural syntax of the document near the location of the detected new text; and
add the at least one new document index entry to the document index as the new index item that operates as a contextual pointer to the location of the detected new text within the document.

10. The system of claim 8, where the processor is further programmed to:
compare the detected new text of the document with each of existing embedded document index entries structurally located near the detected new text within the document and with existing contextual text located near the existing embedded document index entries within the document from which the existing embedded document index entries were created; and
determine, using each of the computer-executable document index entry generation transforms and the existing contextual text located near the existing embedded document index entries within the document from which the existing embedded document index entries were created, whether any of the detected new text comprises candidate text that is not already indexed within the existing embedded document index entries and the document index within the document.

11. The system of claim 8, where the processor is further programmed to:
   derive the contextual index item generation rules in accordance with analysis of existing embedded document index entries within the document and existing contextual text located within the document from which the existing embedded document index entries within the document were created; and
   create the contextual index compendium using the derived contextual index item generation rules.

12. The system of claim 8, where the contextual index item generation rules of the obtained contextual index compendium further define computer-executable consistency checks for usage of words and phrases among the embedded document index entries distributed throughout the document, and where the processor is further programmed to:
   perform an inconsistency check on the usage of words and phrases among the embedded document index entries distributed throughout the document using the computer-executable consistency checks defined within the contextual index item generation rules.

13. The system of claim 8, where the contextual index item generation rules of the obtained contextual index compendium further define a configured variable target document index entry distribution density that varies embedded document index entry density within the document according to a level of detail within text of the document, and, where the processor is further programmed to:
   perform an embedded document index entry density check on the embedded document index entries distributed throughout the document using the configured variable target document index entry distribution density defined within the contextual index item generation rules.

14. A computer program product, comprising:
   a non-transitory computer readable storage medium having computer readable program code embodied therewith, where the computer readable program code when executed on a computer causes the computer to:
   obtain a contextual index compendium comprising contextual index item generation rules that define computer-executable document index entry generation transforms that when executed transform text of a document via one or more executed text modifications and incrementally in real time, as the text within the document is entered, into embedded document index entries that as modified are: (i) inserted into and distributed throughout the document as part of structural syntax of the document near the text and (ii) pointed to within the document from a document index that forms a portion of the document; and
   programmatically transform, via the one or more executed text modifications and incrementally in real time in response to detecting entry of new text into the document by executing at least one of the computer-executable document index entry generation transforms defined within the contextual index item generation rules, the detected new text into at least one new document index entry that are each as modified from the detected new text (i) inserted into the document near a location of the detected new text and (ii) added within the document index as a new index item that points to the respective inserted new document index entry,
   wherein at least one of the document index entry generation transforms, when executed, transforms at least one of:
      a position of a word within the text relative to other words in the text, and
      a grammatical format of the word.

15. The computer program product of claim 14, where in causing the computer to programmatically transform, via the one or more executed text modifications and incrementally in real time in response to detecting the entry of the new text into the document by executing the at least one of the computer-executable document index entry generation transforms defined within the contextual index item generation rules, the detected new text into the at least one new document index entry, the computer readable program code when executed on the computer causes the computer to:
   analyze the detected new text of the document in response to detecting the entry of the new text into the document;
   determine whether at least one contextual index item generation rule exists within the contextual index compendium that comprises a computer-executable document index entry generation transform executable to transform the detected new text via the one or more executed text modifications into the at least one new document index entry; and
   in response to determining that the at least one contextual index item generation rule exists within the contextual index compendium that comprises the computer-executable document index entry generation transform executable to transform the detected new text via the one or more executed text modifications into the at least one new document index entry:
      programmatically create, by processing the detected new text as a new contextual text input using the computer-executable document index entry generation transform, the at least one new document index entry by modifying the new contextual text input into the at least one new document index entry; and
   where the computer readable program code when executed on the computer further causes the computer to:
      insert the at least one new document index entry within the structural syntax of the document near the location of the detected new text; and
      add the at least one new document index entry to the document index as the new index item that operates as a contextual pointer to the location of the detected new text within the document.

16. The computer program product of claim 14, where the computer readable program code when executed on the computer further causes the computer to, in response to determining that at least one contextual index item generation rule does not exist within the contextual index compendium that comprises the computer-executable document index entry generation transform to transform the detected new text via the one or more executed text modifications into the at least one new document index entry:
   create a new contextual index item generation rule that comprises the computer-executable document index entry generation transform that when executed transforms the detected new text via the one or more executed text modifications into the at least one new document index entry using contextual information derived from at least one of additional text, footnotes, and headnotes that surround the detected new text within the document;

add the new contextual index item generation rule to the contextual index compendium; and create the at least one new document index entry using the computer-executable document index entry generation transform created within the new contextual index item generation rule.

17. The computer program product of claim 14, where the computer readable program code when executed on the computer further causes the computer to:

compare the detected new text of the document with each of existing embedded document index entries structurally located near the detected new text within the document and with existing contextual text located near the existing embedded document index entries within the document from which the existing embedded document index entries were created; and determine, using each of the computer-executable document index entry generation transforms and the existing contextual text located near the existing embedded document index entries within the document from which the existing embedded document index entries were created, whether any of the detected new text comprises candidate text that is not already indexed within the existing embedded document index entries and the document index within the document.

18. The computer program product of claim 14, where the computer readable program code when executed on the computer further causes the computer to:

derive the contextual index item generation rules in accordance with analysis of existing embedded document index entries within the document and existing contextual text located within the document from which the existing embedded document index entries within the document were created; and create the contextual index compendium using the derived contextual index item generation rules.

19. The computer program product of claim 14, where the contextual index item generation rules of the obtained contextual index compendium further define computer-executable consistency checks for usage of words and phrases among the embedded document index entries distributed throughout the document, and where the computer readable program code when executed on the computer further causes the computer to:

perform an inconsistency check on the usage of words and phrases among the embedded document index entries distributed throughout the document using the computer-executable consistency checks defined within the contextual index item generation rules.

20. The computer program product of claim 14, where the contextual index item generation rules of the obtained contextual index compendium further define a configured variable target document index entry distribution density that varies embedded document index entry density within the document according to a level of detail within text of the document, and where the computer readable program code when executed on the computer further causes the computer to:

perform an embedded document index entry density check on the embedded document index entries distributed throughout the document using the configured variable target document index entry distribution density defined within the contextual index item generation rules.

* * * * *